United States Patent
Repale et al.

(10) Patent No.: US 11,383,732 B2
(45) Date of Patent: Jul. 12, 2022

(54) UNINTENDED VEHICLE MOTION ALERT SYSTEM

(71) Applicant: Panasonic Automotive Systems Company of America, Division of Panasonic Corporation of North America, Peachtree City, GA (US)

(72) Inventors: Rohan Repale, Farmington Hills, MI (US); William Asa Hughes, Commerce Township, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 323 days.

(21) Appl. No.: 16/709,221

(22) Filed: Dec. 10, 2019

(65) Prior Publication Data

US 2020/0189615 A1    Jun. 18, 2020

Related U.S. Application Data

(60) Provisional application No. 62/779,042, filed on Dec. 13, 2018.

(51) Int. Cl.
*B60W 50/14*   (2020.01)
*B60W 40/08*   (2012.01)
*B60T 7/04*   (2006.01)
*B60T 8/32*   (2006.01)

(52) U.S. Cl.
CPC ............. *B60W 50/14* (2013.01); *B60T 7/042* (2013.01); *B60T 8/3205* (2013.01); *B60W 40/08* (2013.01); *B60W 2040/0818* (2013.01); *B60W 2050/143* (2013.01); *B60W 2050/146* (2013.01)

(58) Field of Classification Search
CPC ................. B60W 50/14; B60W 40/08; B60W 2040/0818; B60W 2050/143; B60W 2050/146; B60T 7/042; B60T 8/3205
See application file for complete search history.

(56) References Cited

FOREIGN PATENT DOCUMENTS

WO    WO-2020055992 A1 *    3/2020   ............ B60W 50/14

* cited by examiner

*Primary Examiner* — Michael D Lang
(74) *Attorney, Agent, or Firm* — Laurence S. Roach, Esq.

(57) ABSTRACT

A driver alert arrangement for a motor vehicle includes a sensor detecting that the motor vehicle is in motion and transmitting a signal indicative of whether the motor vehicle is in motion. A driver monitoring camera captures images of a human driver of the motor vehicle. An electronic processor is communicatively coupled to the sensor, the driver monitoring camera, and to a user interface. The electronic processor receives the signal from the sensor, receives the images captured by the driver monitoring camera, determines from the images where the driver is looking, and alerts the driver via the user interface that the motor vehicle is in motion. The alerting is dependent upon the signal and where the driver is looking.

21 Claims, 2 Drawing Sheets

UNINTENDED VEHICLE MOTION ALERT SYSTEM

CROSS-REFERENCED TO RELATED APPLICATIONS

This application claims benefit of U.S. Provisional Application No. 62/779,042 filed on Dec. 13, 2018, the disclosure of which is hereby incorporated by reference in its entirety for all purposes.

BACKGROUND OF THE INVENTION

1. Field of the Invention

The present invention relates to a method of enhancing the safety of humans and animals who are in or near a motor vehicle.

2. Description of the Related Art

Vehicles can roll if the brakes are not engaged. The combination of insufficient pedal pressure and/or worn brakes can allow the vehicle to move even when the driver intends to brake. The driver might also inadvertently press both the gas pedal and the brake pedal. In these situations, inattentive, inexperienced or uncoordinated drivers can have accidents.

SUMMARY OF THE INVENTION

The invention may alert a driver when a vehicle begins moving. The infotainment system may determine when to alert the driver using inputs from a driver monitoring camera, a brake sensor, and a wheel tick sensor, which detects rotational movement of a wheel. The infotainment system may use an audible chime, a visual indicator, or a head up display (HUD) to alert the driver.

Drivers who may benefit from the alerts of the invention may include inattentive drivers, drivers with impaired mobility, inexperienced drivers, and drivers of vehicles whose brakes are in poor condition.

The invention comprises, in one form thereof, a driver alert arrangement for a motor vehicle, including a sensor detecting that the motor vehicle is in motion and transmitting a signal indicative of whether the motor vehicle is in motion. A driver monitoring camera captures images of a human driver of the motor vehicle. An electronic processor is communicatively coupled to the sensor, the driver monitoring camera, and to a user interface. The electronic processor receives the signal from the sensor, receives the images captured by the driver monitoring camera, determines from the images where the driver is looking, and alerts the driver via the user interface that the motor vehicle is in motion. The alerting is dependent upon the signal and where the driver is looking.

The invention comprises, in another form thereof, a driver alert method for a motor vehicle, including detecting whether the motor vehicle is in motion. A signal indicative of whether the motor vehicle is in motion is transmitted. Images of a human driver of the motor vehicle are captured. The signal and the images captured by the driver monitoring camera are received. It is determined from the images where the driver is looking. The driver is alerted that the motor vehicle is in motion. The alerting is dependent upon the signal and where the driver is looking.

The invention comprises, in yet another form thereof, a driver alert arrangement for a motor vehicle, including a vehicle motion sensor detecting whether the motor vehicle is in motion and transmitting a vehicle motion signal indicative of whether the motor vehicle is in motion. A brake pedal sensor detects whether a brake pedal of the motor vehicle is depressed more than a threshold distance and transmits a brake pedal signal indicative of whether the brake pedal of the motor vehicle is depressed more than the threshold distance. An electronic processor is communicatively coupled to the vehicle motion sensor, the brake pedal sensor, and the user interface. The electronic processor receives the vehicle motion signal from the vehicle motion sensor, receives the brake pedal signal from the brake pedal sensor, and alerts the driver via a user interface that the motor vehicle is in motion. The alerting is dependent upon the vehicle motion signal and the brake pedal signal.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Figure 1:
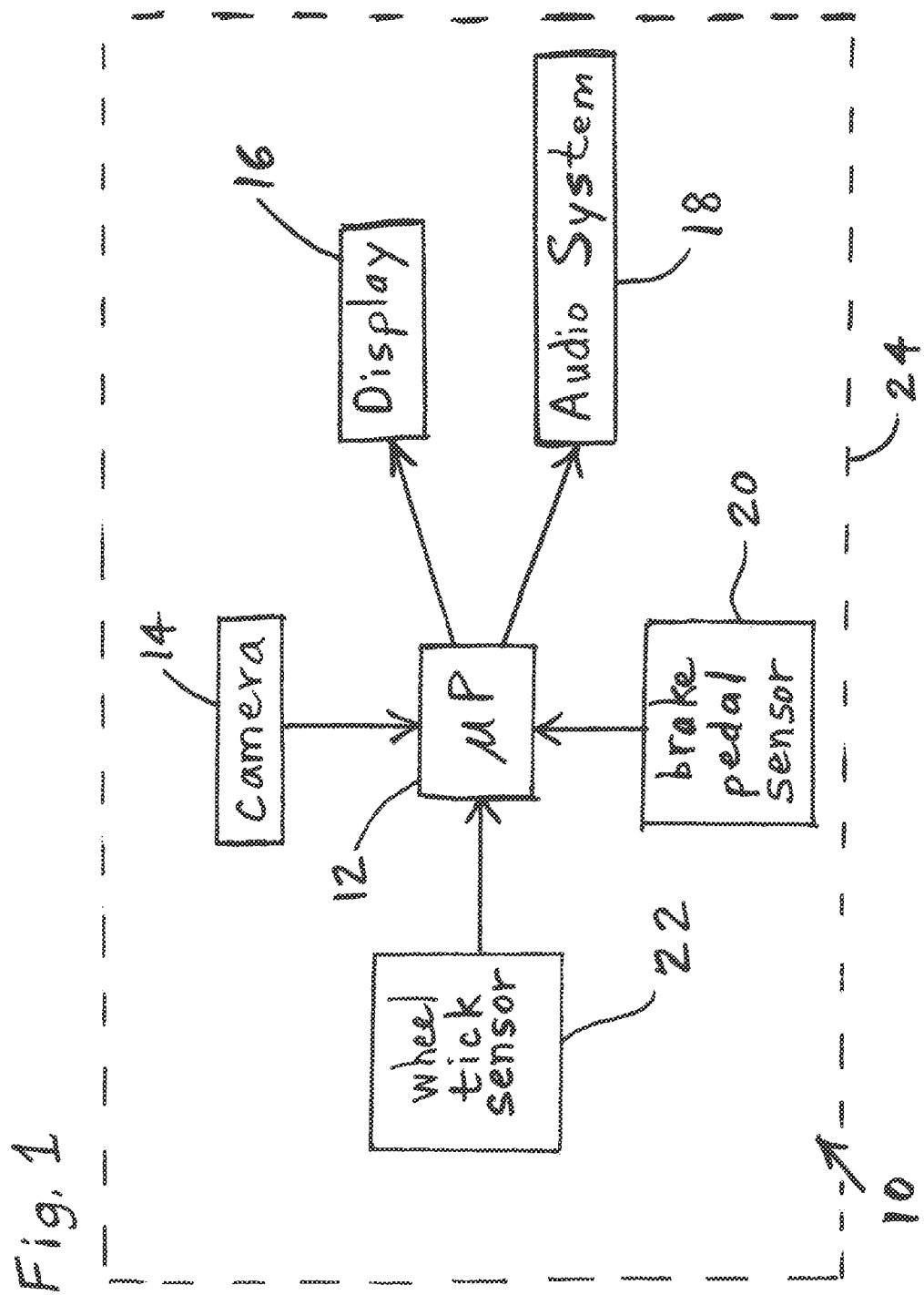
FIG. 1 is a block diagram of one embodiment of an unintended vehicle motion alert system of the present invention.

FIG. 1 illustrates one embodiment of an unintended vehicle motion alert system 10 of the present invention including an electronic processor 12, a camera 14, a display 16, an audio system 18, a brake pedal sensor 20, and a wheel tick sensor 22. All of the above-described components of system 10 may be disposed in or on a single motor vehicle 24.

Camera 14 may be a user monitoring camera that captures images of a human driver and transmits the images to processor 12. Based on the images, processor 12 may detect the field of vision of a human driver of vehicle 24.

Wheel tick sensor 22 may transmit data to processor 12. The data may convey to processor 12 whether vehicle 24 is moving. It is also possible within the scope of the invention to use a global positioning system (GPS) module to detect whether vehicle 24 is moving.

Brake pedal sensor 20 may transmit data to processor 12. The data may convey to processor 12 whether the brake pedal is pushed to a certain threshold.

Display 16 may be in the form of a head up display (HUD), instrument cluster display screen, or a head unit display screen, for example. Display 16 may receive a signal from processor 12 and may provide the driver with visual notification, based on the signal, that vehicle 24 is in motion.

Audio system 18 may include a loudspeaker. Audio system 18 may receive a signal from processor 12 and may provide the driver with audible notification (e.g., a chime), based on the signal, that vehicle 24 is in motion.

During use, processor 12 may determine, based on a signal from wheel tick sensor 22, whether vehicle 24 is in motion. If vehicle 24 is in motion and images captured by camera 14 indicate that the driver is not paying proper attention to the driving task (e.g., the driver is not looking out the windows and is not looking at the dashboard), then processor 12 may alert the driver, via display 16 and/or audio system 18, that vehicle 24 is in motion. If vehicle 24 is in motion and signals from brake pedal sensor 20 indicate that the brake pedal is depressed, then processor 12 may alert the driver, via display 16 and/or audio system 18, that vehicle 24 is in motion.

Figure 2:
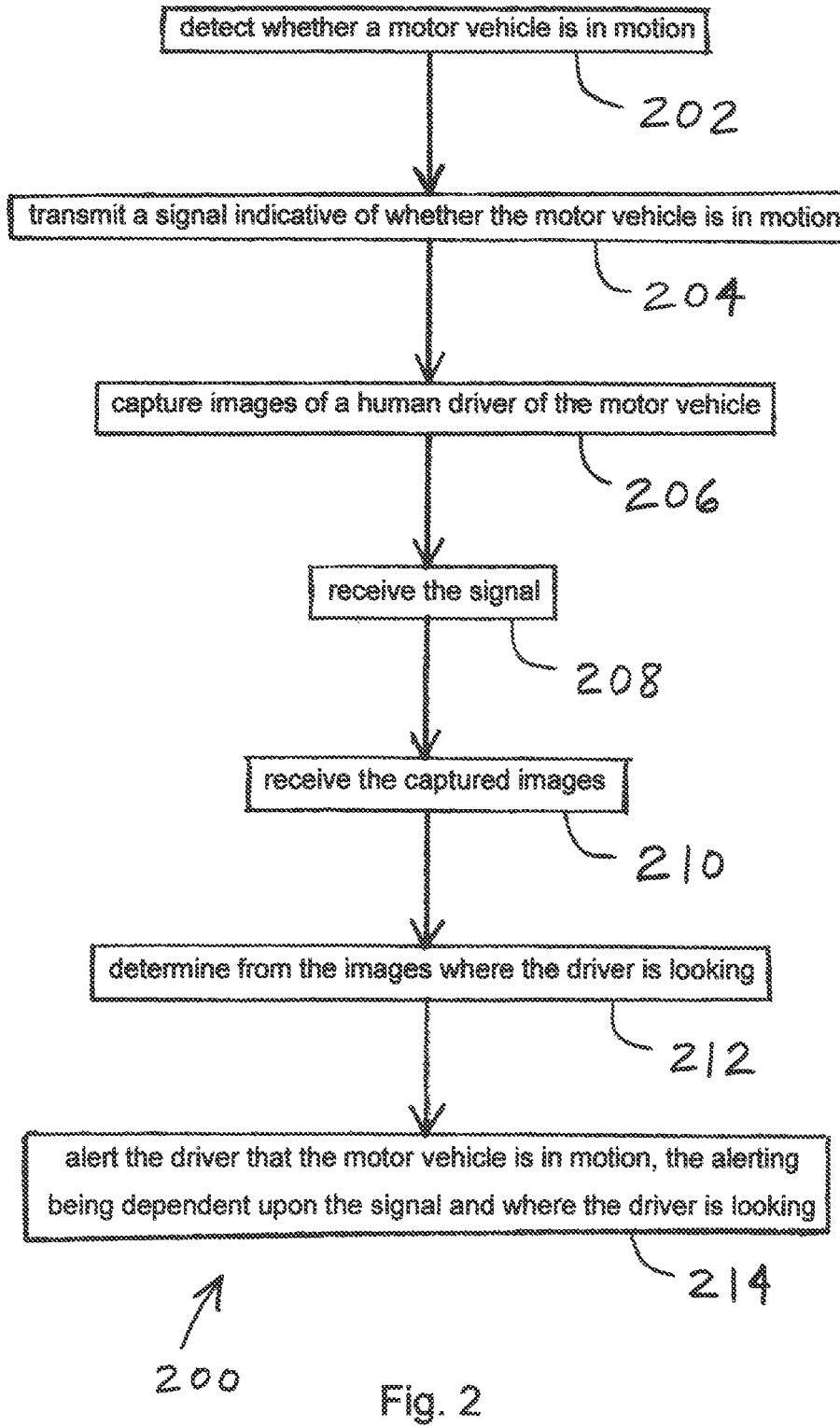
FIG. 2 is a flow chart of one embodiment of a driver alert method of the present invention for a motor vehicle.

FIG. 2 illustrates one embodiment of a driver alert method 200 of the present invention for a motor vehicle. In a first step 202, it is detected whether the motor vehicle is in motion. For example, wheel tick sensor 22 may detect whether a wheel of motor vehicle 24 is rotating, and hence whether vehicle 24 is in motion.

Next, in step 204, a signal indicative of whether the motor vehicle is in motion is transmitted. For example, wheel tick sensor 22 may transmit a signal indicative of whether vehicle 24 is in motion.

In a next step 206, images of a human driver of the motor vehicle are captured. For example, camera 14 may captures images of a human driver of motor vehicle 24.

In step 208, the signal is received. For example, processor 12 may receive the signal transmitted by wheel tick sensor 22.

Next, in step 210, the captured images are received. For example, processor 12 may receive the captured images from camera 14.

In a next step 212, it is determined from the images where the driver is looking. For example, based on the images, processor 12 may determine the field of vision of a human driver of vehicle 24 and whether the driver is looking out the window or is looking at the dashboard, for instance.

In a final step 214, the driver is alerted that the motor vehicle is in motion. The alerting is dependent upon the signal and where the driver is looking. For example, if processor 12 determines based on a signal from wheel tick sensor 22 that vehicle 24 is in motion, and that the driver is not paying proper attention to the driving task (e.g., the driver is not looking out the windows and is not looking at the dashboard), then processor 12 may alert the driver, via display 16 and/or audio system 18, that vehicle 24 is in motion.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A driver alert arrangement for a motor vehicle, comprising:
   a sensor configured to detect whether the motor vehicle is in motion and transmit a signal indicative of whether the motor vehicle is in motion;
   a driver monitoring camera configured to capture images of a human driver of the motor vehicle;
   a user interface; and
   an electronic processor communicatively coupled to the sensor, the driver monitoring camera, and the user interface, the electronic processor being configured to:
   receive the signal from the sensor;
   receive the images captured by the driver monitoring camera;
   determine from the images where the driver is looking; and
   alert the driver via the user interface that the motor vehicle is in motion if the signal indicates that the motor vehicle is moving, the alerting being dependent upon where the driver is looking.

2. The arrangement of claim 1, wherein the sensor comprises a wheel tick sensor.

3. The arrangement of claim 1, wherein the sensor comprises a global positioning system module.

4. The arrangement of claim 1, wherein the processor is configured to alert the driver via the user interface that the motor vehicle is in motion if the signal indicates that the motor vehicle is moving and if the processor determines from the images that the driver is not looking out a window of the vehicle and is not looking at a dashboard of the vehicle.

5. The arrangement of claim 1, wherein the processor is configured to alert the driver that the motor vehicle is in motion via a visual indication.

6. The arrangement of claim 5, wherein the visual indication is provided by a head up display, an instrument cluster, or a head unit.

7. The arrangement of claim 1, wherein the processor is configured to alert the driver that the motor vehicle is in motion via an audible chime.

8. A driver alert method for a motor vehicle, comprising:
   detecting whether the motor vehicle is in motion;
   transmitting a signal indicative of whether the motor vehicle is in motion;
   capturing images of a human driver of the motor vehicle;
   receiving the signal;
   receiving the captured images;
   determining from the images where the driver is looking; and
   alerting the driver that the motor vehicle is in motion if the signal indicates that the motor vehicle is moving, the alerting being dependent upon where the driver is looking.

9. The method of claim 8, wherein the detecting is performed by a wheel tick sensor.

10. The method of claim 8, wherein the detecting is performed by a global positioning system module.

11. The method of claim 8, wherein the driver is alerted that the motor vehicle is in motion if the signal indicates that the motor vehicle is moving and if it is determined from the images that the driver is not looking out a window of the vehicle and is not looking at a dashboard of the vehicle.

12. The method of claim 8, wherein the driver is alerted that the motor vehicle is in motion via a visual indication.

13. The method of claim 12, wherein the visual indication is provided by a head up display, an instrument cluster, or a head unit.

14. The method of claim 8, wherein the driver is alerted that the motor vehicle is in motion via an audible chime.

15. A driver alert arrangement for a motor vehicle, comprising:
   a vehicle motion sensor configured to detect whether the motor vehicle is in motion and transmit a vehicle motion signal indicative of whether the motor vehicle is in motion;
   a brake pedal sensor configured to detect whether a brake pedal of the motor vehicle is depressed more than a threshold distance and transmit a brake pedal signal indicative of whether the brake pedal of the motor vehicle is depressed more than the threshold distance;

a user interface; and an electronic processor communicatively coupled to the vehicle motion sensor, the brake pedal sensor, and the user interface, the electronic processor being configured to:

receive the vehicle motion signal from the vehicle motion sensor;

receive the brake pedal signal from the brake pedal sensor; and alert the driver via the user interface that the motor vehicle is in motion if the vehicle motion signal indicates that the motor vehicle is moving, the alerting being dependent upon the brake pedal signal.

16. The arrangement of claim 15, wherein the vehicle motion sensor comprises a wheel tick sensor.

17. The arrangement of claim 15, wherein the vehicle motion sensor comprises a global positioning system module.

18. The arrangement of claim 15, wherein the processor is configured to alert the driver via the user interface that the motor vehicle is in motion if the vehicle motion signal indicates that the motor vehicle is moving and if the processor determines from the brake pedal signal that the brake pedal of the vehicle is depressed more than a threshold degree.

19. The arrangement of claim 15, wherein the processor is configured to alert the driver that the motor vehicle is in motion via a visual indication.

20. The arrangement of claim 19, wherein the visual indication is provided by a head up display, an instrument cluster, or a head unit.

21. The arrangement of claim 15, wherein the processor is configured to alert the driver that the motor vehicle is in motion via an audible chime.

* * * * *